July 31, 1962 W. A. SCHWABLE 3,046,817
ACCESSORY FOR PORTABLE DRILLS
Filed Sept. 12, 1961 2 Sheets-Sheet 1
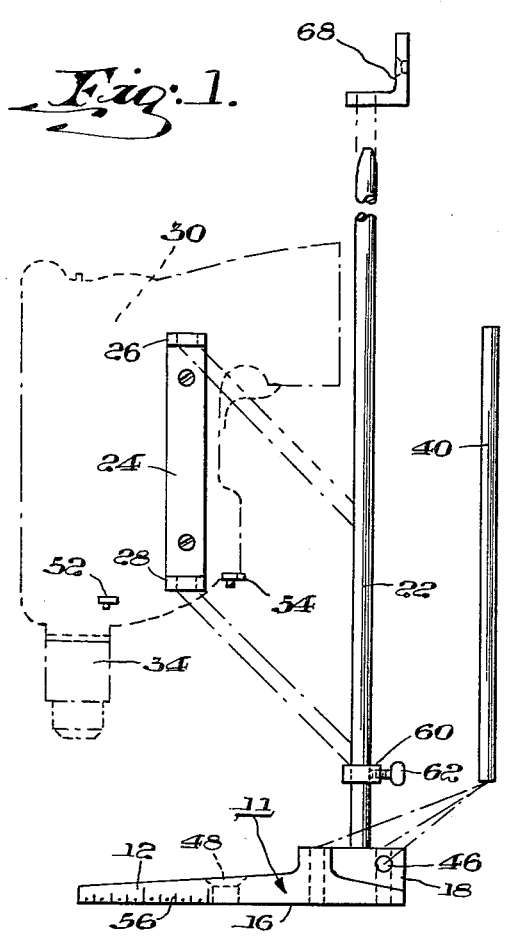
Fig. 1.
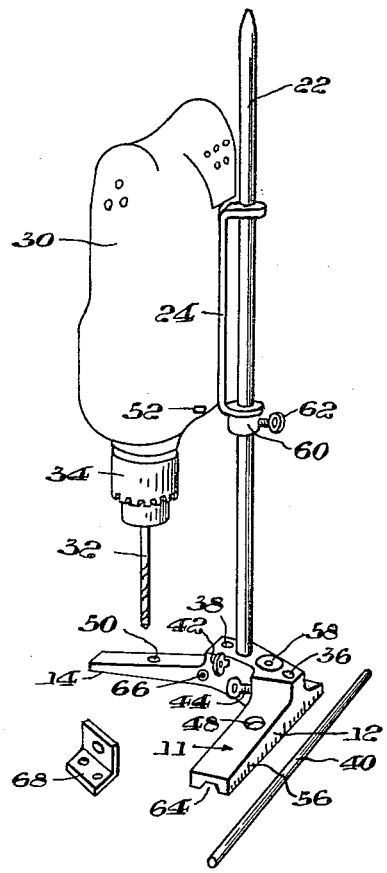
Fig. 4.
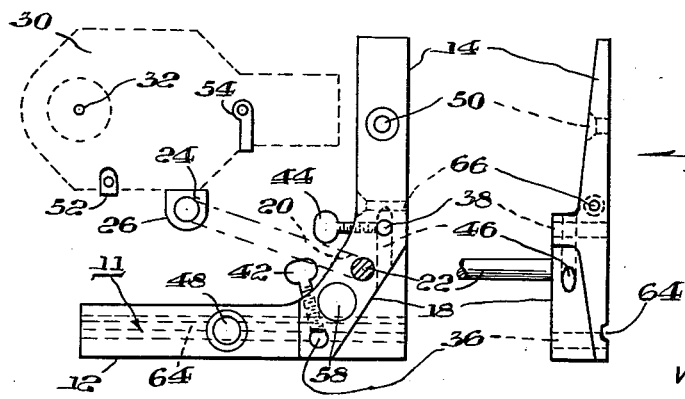
Fig. 3.
Fig. 2.
INVENTOR.
WILFRID A. SCHWABLE.
BY *[signature]*
his ATTORNEY.

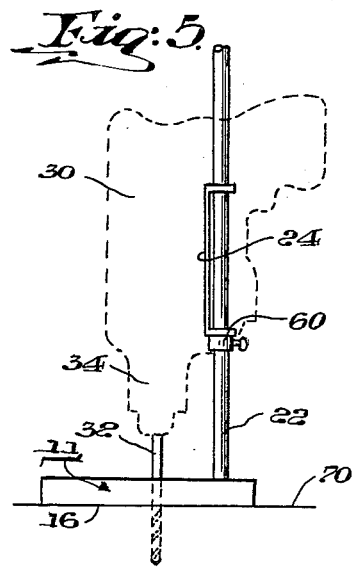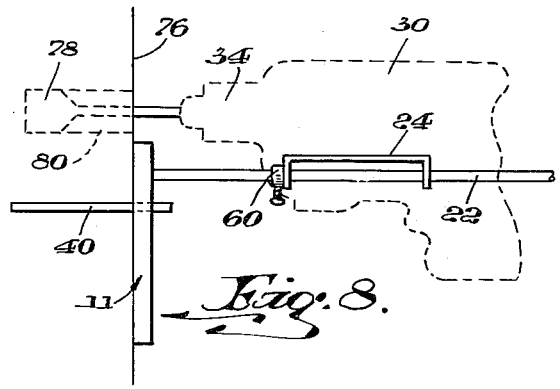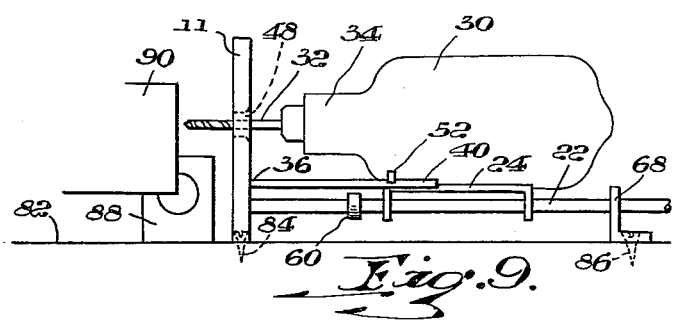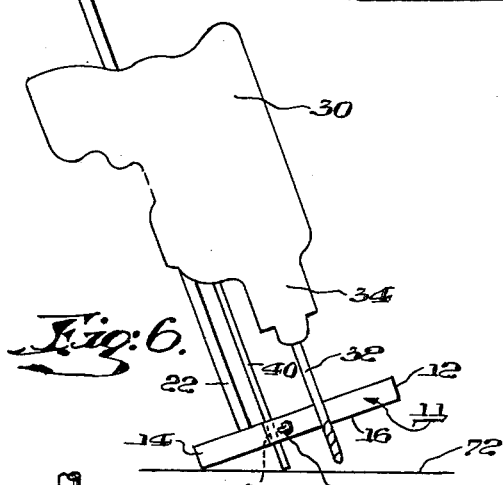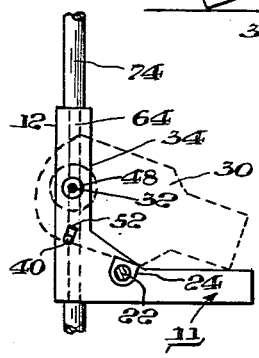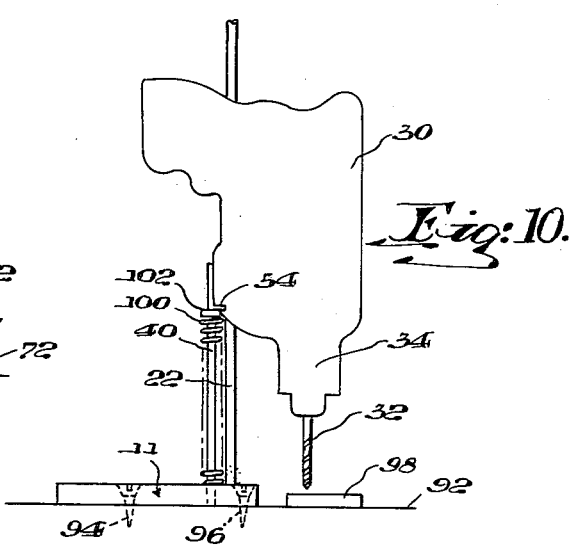

United States Patent Office 3,046,817
Patented July 31, 1962

3,046,817
ACCESSORY FOR PORTABLE DRILLS
Wilfrid A. Schwable, Rte. 4, Box 37, Traverse City, Mich.
Filed Sept. 12, 1961, Ser. No. 137,677
20 Claims. (Cl. 77—7)

This invention relates to a device for three dimensional guidance and control of a hand-held portable electric drill and more particularly to a device of the type described which may be readily detached from the drill to permit it to be used independently.

As is known, there are two major types of power drills. The one, usually referred to as a drill press, comprises a stand secured to a bench or the like together with a motor-driven drill fixed to the stand for reciprocating movement in a vertical direction. In a conventional drill press of this type, it is not at all convenient or practical to remove the drill from the stand; and since the equipment is a permanent installation, all workpieces must be taken to the drill stand for drilling, meaning that it is not practical for large and heavy or bulky articles or for applications where holes must be drilled in fixed structures such as building walls. The fixed drill press does, however, have the advantage of being able to drill holes at precise and controlled angles and depths with respect to the workpiece.

The other type of drill, called a hand drill, simply comprises a hand-held electric motor having a chuck on its shaft for the reception of drillpoints. Although a drill of this sort is much less expensive than a drill press and is highly versatile in that it can be carried from place-to-place, the angle as well as the depth of the hole produced by such a drill cannot be controlled within close tolerances and its use is, therefore, limited to applications where accuracy is unimportant.

As an overall object, the present invention provides apparatus which combines the advantages of the drill press and the hand-held drill.

More specifically, an object of the invention is to provide a hand-held device for three dimensional guidance and control of a hand-held portable drill and which will permit instant separation of the drill for detached use.

Other objects of the invention are to provide a novel, detachable drill stand for a hand drill which facilitates drilling angled holes in plane surfaces, spotting holes over marked points, drilling diametric holes in cylindrical workpieces, accurate edge drilling of boards including the mortising of tubular locks in doors, and depth rounting for door hinges.

The above and other objects and features of the invention will become apparent from the following detailed description taken in connection with the accompanying drawings which form a part of this specification, and in which:

FIGURE 1 is a side elevational view of the drill guidance device of the present invention;

FIGURE 2 is a top view for the apparatus shown in FIGURE 1;

FIGURE 3 is an end view of the base of the guidance device shown in FIGURES 1 and 2;

FIGURE 4 is a perspective view of the guidance device showing the manner in which a hand-held portable drill is supported thereon;

FIGURES 5 is an illustration of one use of the invention for drilling holes in workpieces, said holes being perpendicular to the surface of the workpiece;

FIGURE 6 is an illustration of the use of the invention for drilling an angled hole;

FIGURE 7 is an illustration of the use of the invention for drilling diametric holes in tubular or cylindrical workpieces;

FIGURE 8 is an illustration of the use of the invention in mortising a tubular lock;

FIGURE 9 is an elevational view of the guidance device of the invention used as a horizontal boring machine for doweling and other similar application; and FIGURE 10 is an illustration of the use of the invention as a fixed vertical stand for a hand-held portable drill.

Referring now to the drawings, and particularly to FIGURES 1, 2, 3 and 4, the apparatus shown includes a generally L-shaped base 11 having two legs 12 and 14 disposed at right angles with respect to each other. As shown, the base 11 has a flat bottom surface 16, and at the junction of legs 12 and 14 is a raised portion 18 having a bore 20 therein for the reception of an upright column 22. Column 22 extends perpendicular to the flat bottom 16 of base 11 and is adapted to receive, for sliding movement, a yoke 24 having a pair of tabs 26 and 28 with holes therein for the reception of the column 22. The yoke 24 is screwed or otherwise securely fastened to a drill 30 such that the axis of the holes or openings in tabs 26 and 28 will be parallel to a drillpoint 32 which fits into a chuck 34 on the drill 30. In this manner, the yoke 24 may be slipped over the pointed upper end of the column 22 and the drill and yoke reciprocated on the column 22 in a direction parallel to the axis of column 22 and perpendicular to the flat bottom surface 16 of base 11. Thus, assuming that the base rests on a flat workpiece, movement of the drill downwardly on the column 22 will insure that the resulting drilled hole extends perpendicular to the flat surface of the workpiece.

Extending through raised portion 18 of the base 11 on either side of the bore 20 are a pair or holes 36 and 38, either one of which is adapted to receive a guide rod 40 for a purpose which will hereinafter be explained. As shown, the ends of thumbscrews 42 and 44 extend into bores 36 and 38 for the purpose of securing guide rod 40 therein at any point along its axial length. While not in use, the guide rod 40 may be inserted into opening 46 for storage and held therein by means of the thumbscrew 44.

In leg 12 of base 11 is a bore 48, while a similar bore 50, which serves only as a screw hole is provided in the leg 14. The radial distance betwen the axis of column 22 and the axis of the bore 48 is equal to the radial distance between the axis of the openings in tabs 26 and 28 of yoke 24 and the axis of drillpoint 32. Thus, assuming that the yoke 24 has been inserted onto the column 22, the drill may be rotated into a position where the drillpoint will be aligned with the bore 48. In this connection, it will be noted that a pair of stops or projections 52 and 54 are secured to the drill 30. The stop 52 will engage guide rod 40 in bore 36 when the drill is rotated to a point where the drillpoint 32 is aligned with bore 48. At the same time, the stop 52 permits sliding movement of the drill along the guide rod to allow the drillpoint to move into or out of the bore 48. If desired, graduations 56 may be provided on the side of one or both of the legs 12 and 14; and a spirit level, generally indicated at 58, may be inserted into the raised portion 18 of base 11 for a purpose well known to those skilled in the art.

In order to limit downward movement of the drillpoint 32 into a workpiece to be drilled, a collar 60 is slideably received on the column 22 and may be secured to the column at any point along its length by means of a thumbscrew 62. The collar 60 will, of course, be engaged by the lower tab 28 on yoke 24 and will limit the movement of the drill toward the base. Thus, if it is desired to drill a hole in a workpiece having a depth of one inch, for example, the end of the drillpoint 32 may rest upon the surface of the workpiece and the collar 60 adjusted downwardly on column 22 until it is exactly one inch below the bottom surface of tab 28. In this manner, the drillpoint will move downwardly into the workpiece by exactly one inch before it engages collar 60 and is prevented from further movement.

In the bottom of leg 12 of base 11 is a beveled groove or notch 64 having an axis which intersects the axis of bore 48. As will be seen, this groove is provided for the purpose of drilling diametric holes in cylindrical or tubular workpieces. If it is desired to secure the device to a bench in either a vertical or horizontal position, a screw may be passed through opening 66 in leg 14 and screwed into the bench while the end of column 22 is supported by means of a L-shaped bracket 68 which fits over the end of column 22 and may be likewise screwed to the same bench.

Referring now to FIGURE 5 an application of the invention is shown wherein the drillpoint 32 enters the surface of workpiece 70 perpendicularly. It will be noted that since the flat bottom surface 16 of base 11 is perpendicular to the column 22, and since the drill 30 and drillpoint 32 must reciprocate parallel to the column 22, the drillpoint 32 will positively and accurately enter the workpiece 70 perpendicular to its surface. The maximum depth of the hole drilled is dependent upon the positioning of collar 60 on column 22. Thus, in the position shown in FIGURE 5, the drillpoint 32 will have entered the workpiece 70 to its maximum depth as determined by the positioning of the collar. In this application, the axis of the drillpoint 32 is free to swing radially around the axis of the column 22; and positioning of the hole in the workpiece is accomplished by sliding base 11 so that the drill is over one coordinate of the hole and thereafter swinging the drill radially over the other coordinate. This, of course, results in better speed and accuracy than the usual free-hand method.

FIGURE 6 illustrates one method for drilling an angled hole in a workpiece 72. In this application, the guide rod 40 is inserted into bore 36, for example, and the length of the guide rod extending beneath the flat surface 16 of the base 11 is adjusted for the proper angle. Thereafter, the thumbscrew 42 is tightened and the assembly is supported on the workpiece 72 with one hand while the lower end of rod 40 and the edge of leg 14 rests on the workpiece. The other hand is then used to manipulate the drill 30 upwardly and downwardly on column 22 to drill the desired hole.

In FIGURE 7 an application of the invention is shown for drilling a diametric hole in a tubular or cylindrical workpiece 74. In this application, the base 11 is positioned over the workpiece 74 such that the notch or groove 64 in leg 12 fits over or straddles the workpiece. By virtue of the beveled surfaces on the groove 64 as shown in FIGURE 3, the groove will extend parallel to the longitudinal axis of the workpiece 74; and since the axes of bore 48 and column 22 are perpendicular to the axis of groove 64, the drillpoint 32, when passed through hole 48 and the workpiece, will drill a hole diametrically through that workpiece. It will be noted that in this application, the stop 52 engages guide rod 40 in position where the drillpoint 32 is in axial alignment with hole 48, thereby insuring that the drillpoint will pass through the center of the cylindrical or tubular workpiece 74. This same arrangement may be used on flatwork to position the drill point over a marked point on the work. The drill is radially swung into one side while bore 48 is centered over the point. Thereafter, the drill 30 is rotated about column 22 until stop 52 engages guide rod 40, at which point the drillpoint will be centered over the bore 48.

The FIGURE 8 the invention is shown as applied to mortising a tubular lock. The base 11 is hand-held against the edge of a door 76, and the guide rod 40 secured within bore 36 by thumbscrew 42 such that it may be held flush against the side of the door 76. Thus, even though the width of the edge of door 76 is relatively narrow, the combined action of the base 11 on the edge of the door and the guide rod 40 on the side of the door, assurance is given that the column 22 and the drill 30 carried thereby are parallel to the sides of the door. Thus, with the base 11 and guide rod 40 held against the edge of the door with one hand, the drill 30 and mortising tool 78 may be pushed forwardly to drill a circular hole 80 in door 76 for reception of the tubular lock. The depth to which the hole 80 is drilled will, of course, be controlled by the position of collar 60 on column 22. With this arrangement, it can be seen that an accurately positioned hole 80 may be drilled within close tolerances while requiring very little skill on the part of the user. The arrangement of FIGURE 8 may also be used for depth mortising on hinges, doweling and the like.

In FIGURE 9 the apparatus is shown for use as a horizontal boring machine for doweling and other similar applications. In this case the leg 14 of base 11 is secured to a workbench 82 by means of a screw 84 which passes through opening 66. The outer end of column 22 is, in a similar manner, secured to workbench 82 by means of the L-shaped bracket 68 which is screwed to the workbench by screws 86. Guide rod 40 is inserted into bore 36 and secured therein by means of thumbscrew 42, while the stop 52 slides along the guide rod, thereby insuring that the drillpoint 32 is in axial alignment with the bore 48 in leg 12 which now extends vertically upwardly. Accurate production work can be accomplished with this set-up with jigs or fixtures 88 to position the workpiece 90.

FIGURE 10 illustrates a fixed vertical application of the device wherein the base 11 is screwed to a workbench 92 by means of screws 94 and 96 which pass through bores 48 and 50 in legs 12 and 14, respectively. In this case, the guide rod 40 is again secured within bore 36, while the stop 54 engages the guide rod for sliding movement so that the drillpoint 32 engages a predetermined point outside the base 11. The workpiece 98 will usually be positioned by jigs or fixtures, not shown. If desired, a coil spring 100 and washer 102 may be inserted over the guide rod 40 such that stop 54 will rest on the washer 102. In this manner, the spring will automatically retract the drill after it has been pushed downwardly.

Although the invention has been shown in connection with certain specific embodiments, it will be readily apparent to those skilled in the art that various changes in form and arrangement of parts may be made to suit requirements without departing from the spirit and scope of the invention. In this respect, it is apparent that a nylon tube or the like could be substituted for the metal yoke 24, and that the yoke and stops 52 and 54 could be integrated into the drill body proper.

I claim as my invention:

1. A device for three dimensional guidance and control of a hand-held portable electrical drill comprising a base having a flat lower surface adapted to be positioned against a workpiece to be drilled, said base having a pair of legs positioned at right angles with respect to each other in a common plane, a column secured to said base at the junction of said legs with the column being perpendicular to said flat lower surface, a member slidably received on said column and adapted to carry said electric drill whereby the drill and said member may move along a path extending parallel to the column, a bore extending through one of said legs and having an axis extending parallel to the axis of said column, a guide rod adapted to be received within said bore, and means for securing the rod in the bore with any desired length of the rod extending below the bottom surface of the base, the arrangement being such that the device may be supported for angle drilling on a workpiece with the other leg of the base and the lower end of the rod resting on the workpiece while said one leg extends upwardly from the workpiece at an angle.

2. The device of claim 1 wherein a bore having an axis extending parallel to the axis of said column is provided in each of said legs, each of the bores being adapted to receive said rod and having means for securing the rod therein with any desired length of the rod extending below the bottom surface of the base.

3. The device of claim 1 wherein the member slideably received on the column consists of a longitudinally bored yoke which is permanently fixed to the portable drill in such a manner that the axis of the bore of the yoke is parallel to the axis of the drill point.

4. The device of claim 3 wherein said yoke is permanently and closely integrated with the portable drill body in such position and of such dimensions that the use of the portable drill when disengaged from the column is unimpeded by the yoke, whereby the drill handle is not obstructed and the proximity of the drill to plane or angled surfaces normal to the workpiece is not effected and noticeable weight is not added to the portable drill.

5. The device of claim 1 including stop members on the drill, wherein a second bore is provided in the other of said legs, and wherein the guide rod is positioned to extend above the base only and contacts said stop members on the portable drill in such a manner that the free radial swing of the drill around the column is limited at two points on the arc of the drill point around the column, one point being over said second bore in one of the legs of the base and the other point being outside the area between the legs.

6. The device of claim 1 wherein a slideably adjustable collar on the column performs the function of a depth gage, and wherein the guide rod acts as an angle gage.

7. The device of claim 1 wherein the guide rod acts as an alignment gage for lateral drilling of thin workpieces such as lock mortises in doors.

8. The device of claim 1 wherein the guide rod is used above the base for positioning the drill point.

9. The device of claim 1 including a stop on the portable drill, and wherein the guide rod is encircled with a spiral spring which contacts said stop on the portable drill and acts as a drill return.

10. The device of claim 1 wherein the guide rod is stored in a bore in the base and wherein the base is fastened to a bench to simulate an upright drill press.

11. The device of claim 1 wherein the drill may be slidably removed from the column for detached use without adjustment or removal of any of the component parts of the device.

12. The device of claim 1 wherein the right angled legs are finished and calibrated on their two outer faces for use as a small carpenter square, and wherein a spherical segment spirit level is incorporated into the top surface of the base and a horizontal bore in the base forms a storage pocket for the guide rod when not in use.

13. The device of claim 1 wherein the device is adapted for precise horizontal boring by fastening to a bench with fastening elements, one fastening element passing through a bore in one leg of the base, and the other fastening element comprising an angle-piece having one leg secured to the bench and another leg bored to receive and support the column in a position parallel to the bench.

14. A device for three dimensional guidance and control of a hand-held portable electric drill comprising a base adapted to be positioned against a workpiece to be drilled, said base having a pair of legs positioned at right angles with respect to each other in a common plane, a column secured to said base at the junction of said legs with the column being perpendicular to said common plane, a member slideably received on said column and arranged to carry said electric drill whereby the drill and said member may move along a path extending parallel to the column, and a support on the end of said column opposite the base, said support having a surface spaced from the axis of said column in an amount equal to the spacing between one edge of the base and the axis of the column, the arrangement being such that the column may be supported in a horizontal position on said surface of the support and said edge of the base.

15. In combination, a hand-held portable electric drill, a base adapted to be positioned against a workpiece to be drilled, said base having a pair of legs positioned at right angles with respect to each other in a common plane, a column secured to said base at the junction of said legs with the column being perpendicular to said common plane, a yoke secured to said drill and slideably received on said column whereby the drill and yoke may move along a path extending parallel to the column, a bore extending through one of said legs and having an axis extending parallel to the axis of said column, a guide rod received within said bore whereby the guide rod will extend parallel to said column, and means on said drill for slideably engaging said rod as the drill and yoke are moved along said column whereby the rod will prevent rotation of the drill about the axis of said column as it moves along a path extending parallel to the column.

16. In combination, a hand-held portable electric drill, a base adapted to be positioned against a workpiece to be drilled, said base having a pair of legs positioned at right angles with respect to each other in a common plane, a column secured to said base at the junction of said legs with the column being perpendicular to said common plane, a yoke secured to said drill and slideably received on said column whereby the yoke and the electric drill secured thereto may move along a path extending parallel to the column, a bore extending through one of said legs and having an axis extending parallel to the axis of said column, a guide rod received within said bore such that the guide rod extends parallel to said column, a bore extending through said one leg, said bore having an axis extending parallel to said column and said guide rod, and means on said drill for engaging said guide rod when the drill is rotated about said column to a position where its drillpoint is in axial alignment with the bore in said one leg, the arrangement being such that the drill will be guided on the column and said guide rod for straight-line movement into and out of the bore in said one leg.

17. A device for three dimensional guidance and control of a hand-held portable electric drill having a drillpoint thereon comprising a base adapted to be positioned against a workpiece to be drilled, said base having a pair of legs positioned at right angles with respect to each other in a common plane, a column secured to said base at the junction of said legs with the column being perpendicular to said common plane, a member slideably received on said column and arranged to carry said electric drill whereby the drill and said member may move along a path extending parallel to the column, first bores in said legs having axes extending parallel to the axis of said column, a guide rod received within either of said first bores for guiding said drill for non-rotational linear movement along said column, and second bores in said legs having axes extending parallel to the axis of said column for receiving the drillpoint of said drill when the drill is guided by said guide rod in one of said first bores.

18. The device of claim 17 and including a collar adjustable axially along said column for limiting movement of the drill along the column toward said base.

19. The device of claim 17 including means on the base for securing the base to a workbench with the column lying in a horizontal position, and a bracket for supporting the end of the column remote from the base on said workbench when the column is in said horizontal position.

20. A device for three dimensional guidance and control of a hand-held portable electric drill for drilling holes in cylindrical workpieces comprising a base adapted to be positioned against a cylindrical workpiece to be drilled and having a pair of legs positioned at right angles with respect to each other in a common plane, a column extending upwardly from said base at the junction of said legs with the column being perpendicular to said common plane, a member slideably received on said column and adapted to carry said electric drill for reciprocating movement along said column, a notch formed in the bottom surface of one of the legs of said base and adapted to receive a cylindrical workpiece to be drilled, and a bore in said one leg communicating with said notch and extending parallel to the axis of said column, said bore being spaced from the column to receive the drill point of said drill whereby the drill point may pass through the bore and engage the cylindrical workpiece in the notch.

References Cited in the file of this patent

UNITED STATES PATENTS

| | | |
|---|---|---|
| 1,470,143 | Buterbaugh | Oct. 9, 1923 |
| 2,891,428 | Donee | June 23, 1959 |
| 2,997,900 | Pugsley | Aug. 29, 1961 |